No. 638,712. Patented Dec. 12, 1899.
C. P. HIGGINS.
RABBETING MACHINE FOR OVAL HAND HOLES.
(Application filed Apr. 24, 1899.)

(No Model.) 6 Sheets—Sheet 1.

No. 638,712. Patented Dec. 12, 1899.
C. P. HIGGINS.
RABBETING MACHINE FOR OVAL HAND HOLES.
(Application filed Apr. 24, 1899.)

(No Model.) 6 Sheets—Sheet 3.

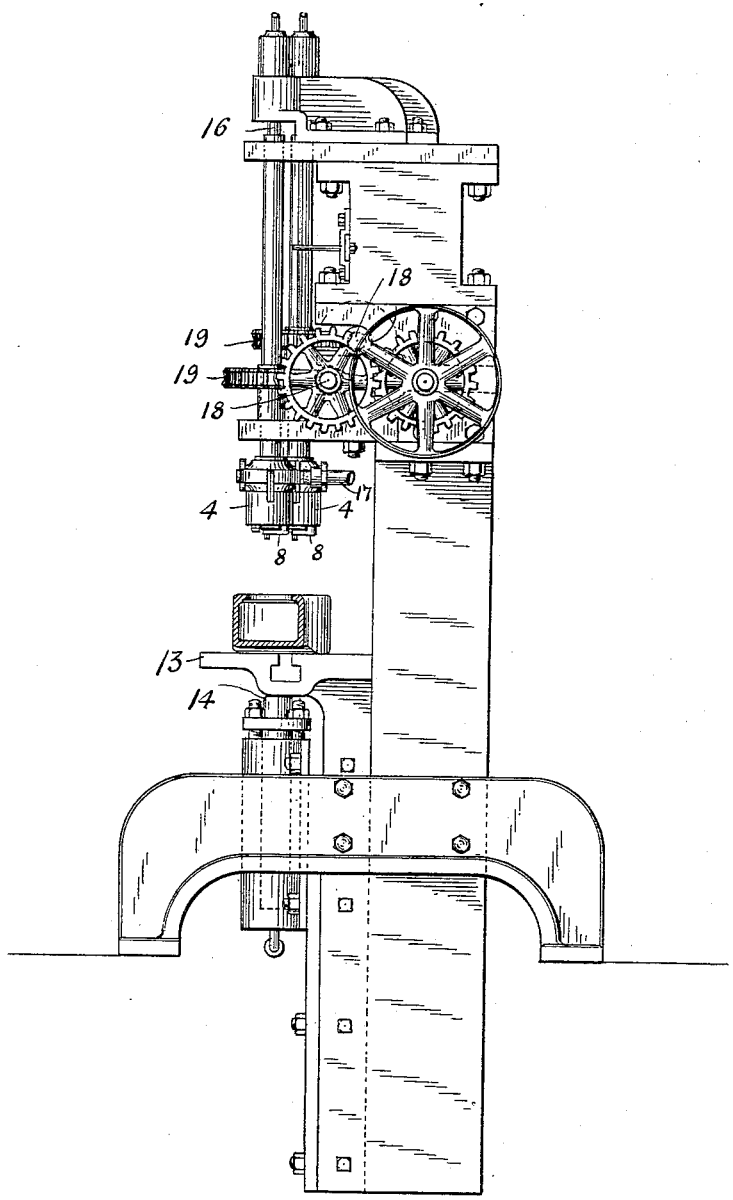

No. 638,712. Patented Dec. 12, 1899.
C. P. HIGGINS.
RABBETING MACHINE FOR OVAL HAND HOLES.
(Application filed Apr. 24, 1899.)
(No Model.) 6 Sheets—Sheet 5.
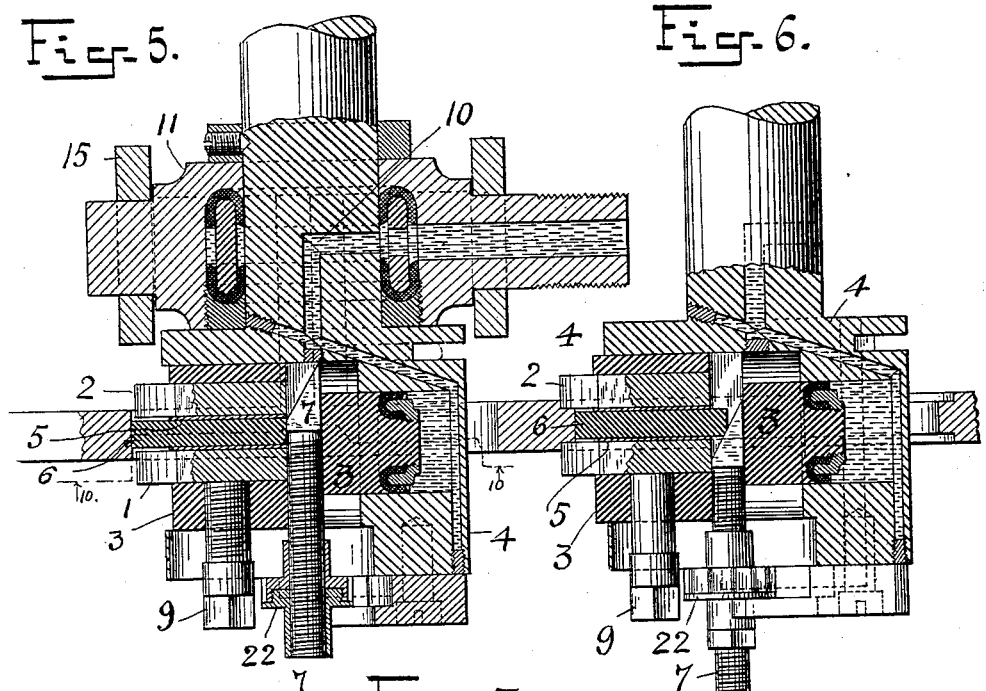
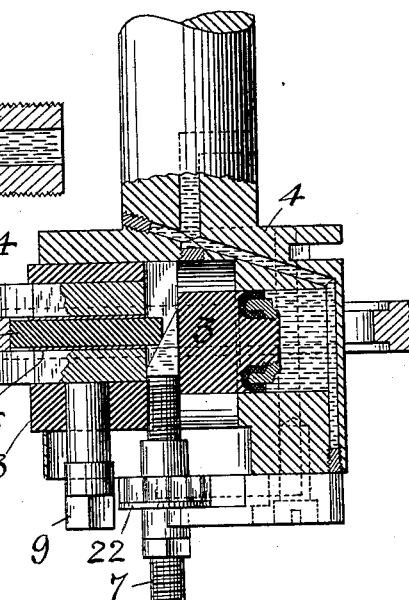
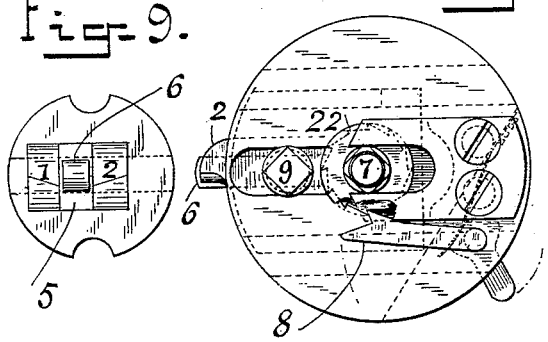
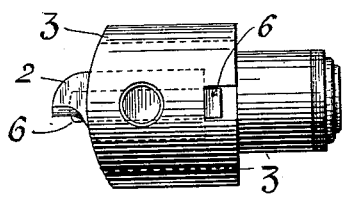
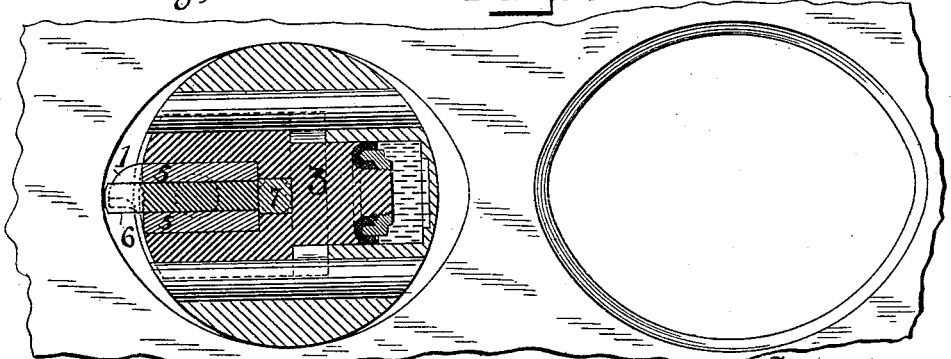
Witnesses
Charles Hanimann
George A. Rowell
Inventor
Campbell P. Higgins
By his Attorney No. 638,712. Patented Dec. 12, 1899.
C. P. HIGGINS.
RABBETING MACHINE FOR OVAL HAND HOLES.
(Application filed Apr. 24, 1899.)
(No Model.) 6 Sheets—Sheet 6.
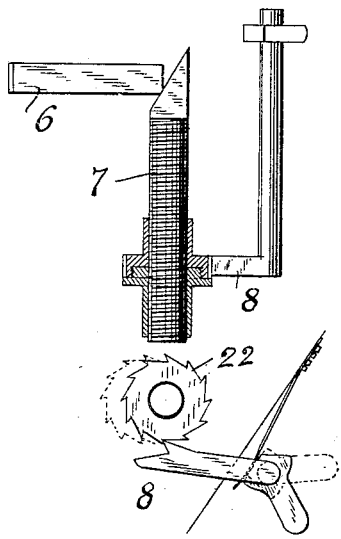
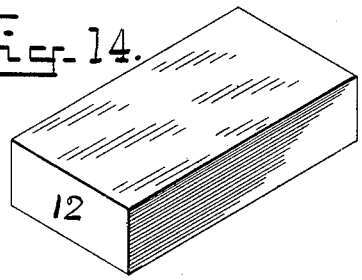
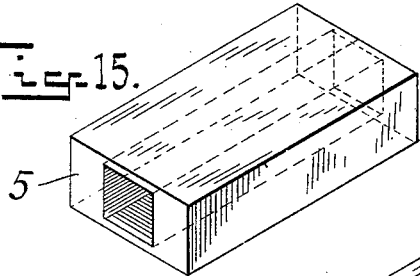
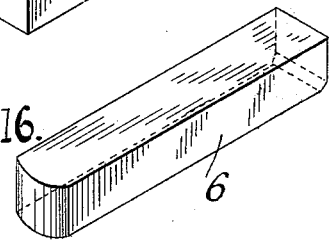
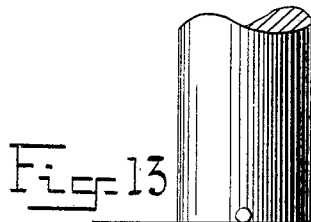
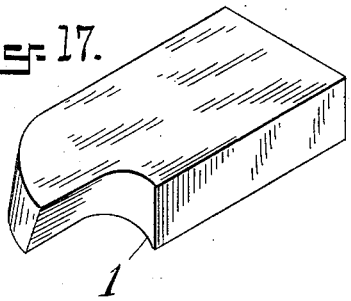
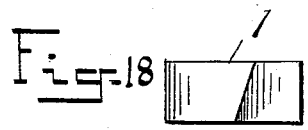
Witnesses
Charles Hanimann
George A. Rowell
Campbell P. Higgins
Inventor
By L. Attorney

UNITED STATES PATENT OFFICE.

CAMPBELL P. HIGGINS, OF ROSELLE, NEW JERSEY, ASSIGNOR TO THE BABCOCK & WILCOX COMPANY, OF NEW YORK.

RABBETING-MACHINE FOR OVAL HAND-HOLES.

SPECIFICATION forming part of Letters Patent No. 638,712, dated December 12, 1899.

Application filed April 24, 1899. Serial No. 714,282. (No model.)

*To all whom it may concern:*

Be it known that I, CAMPBELL P. HIGGINS, a citizen of the United States, residing at Roselle, in the county of Union and State of New Jersey, have invented certain new and useful Improvements in Rabbeting-Machines for Oval Hand-Holes, of which the following is a specification, reference being had therein to the accompanying drawings.

This invention relates to a machine for rabbeting the edge of oval-shaped hand-holes in headers for sectional steam-generators to form a seat for the hand-hole plate.

The object of the invention is to form parallel seats on the outer and inner faces of the header surrounding the hole to accommodate the two members which compose the plate or cover and maintain their proper relative position when seated.

The machine is designed to rabbet the inner and outer face of the header at the edge of the hand-hole simultaneously when two cutters are used or alternately when one cutter only is used.

In order that others may understand and use the invention, I will first proceed to describe a machine embodying it and subsequently will point out in the appended claims its novel characteristics.

Figure 1:
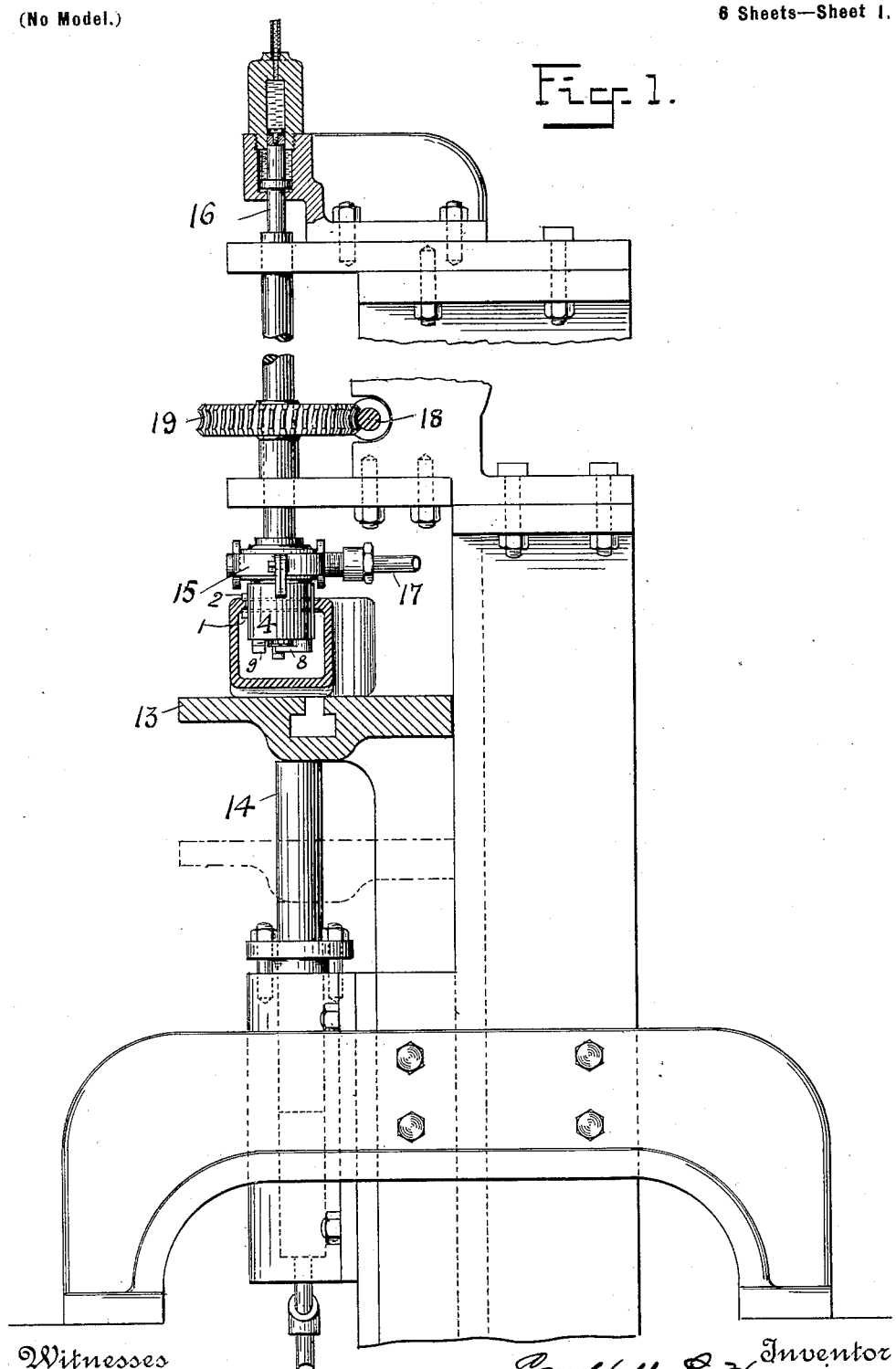
Figure 2:
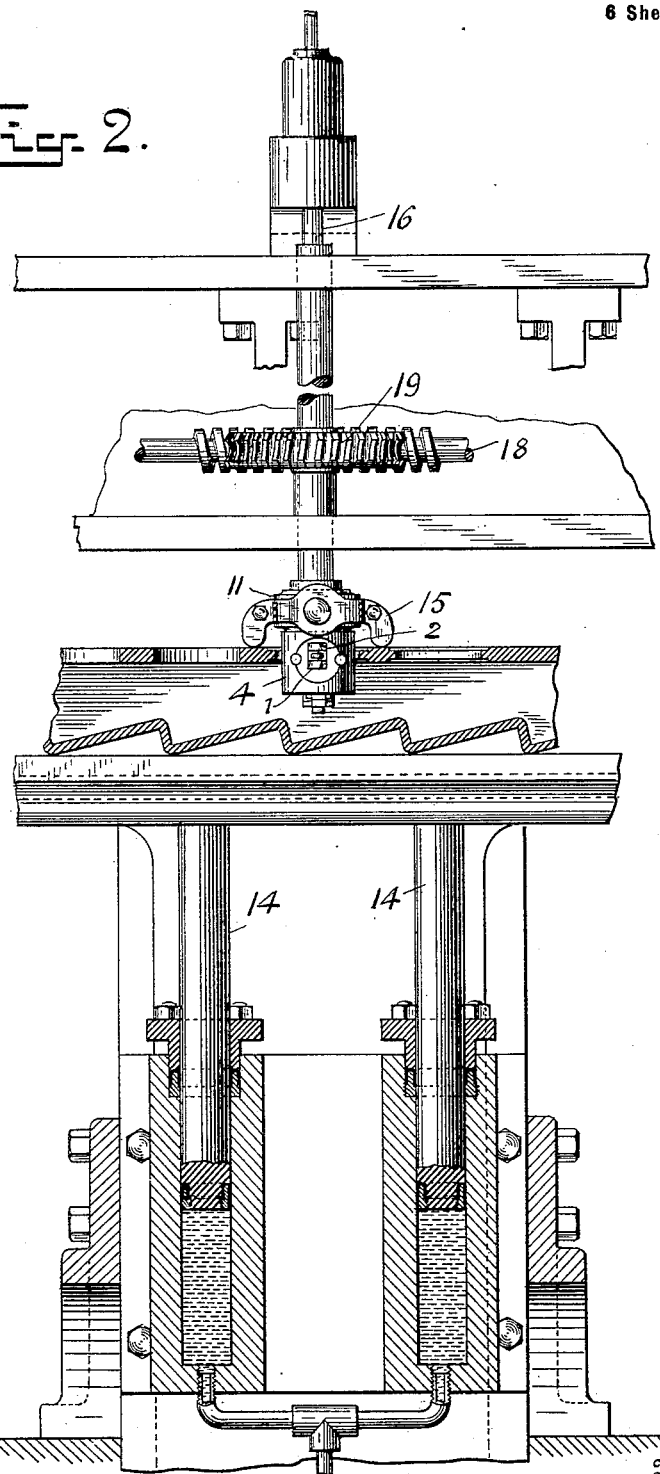
Figure 3:
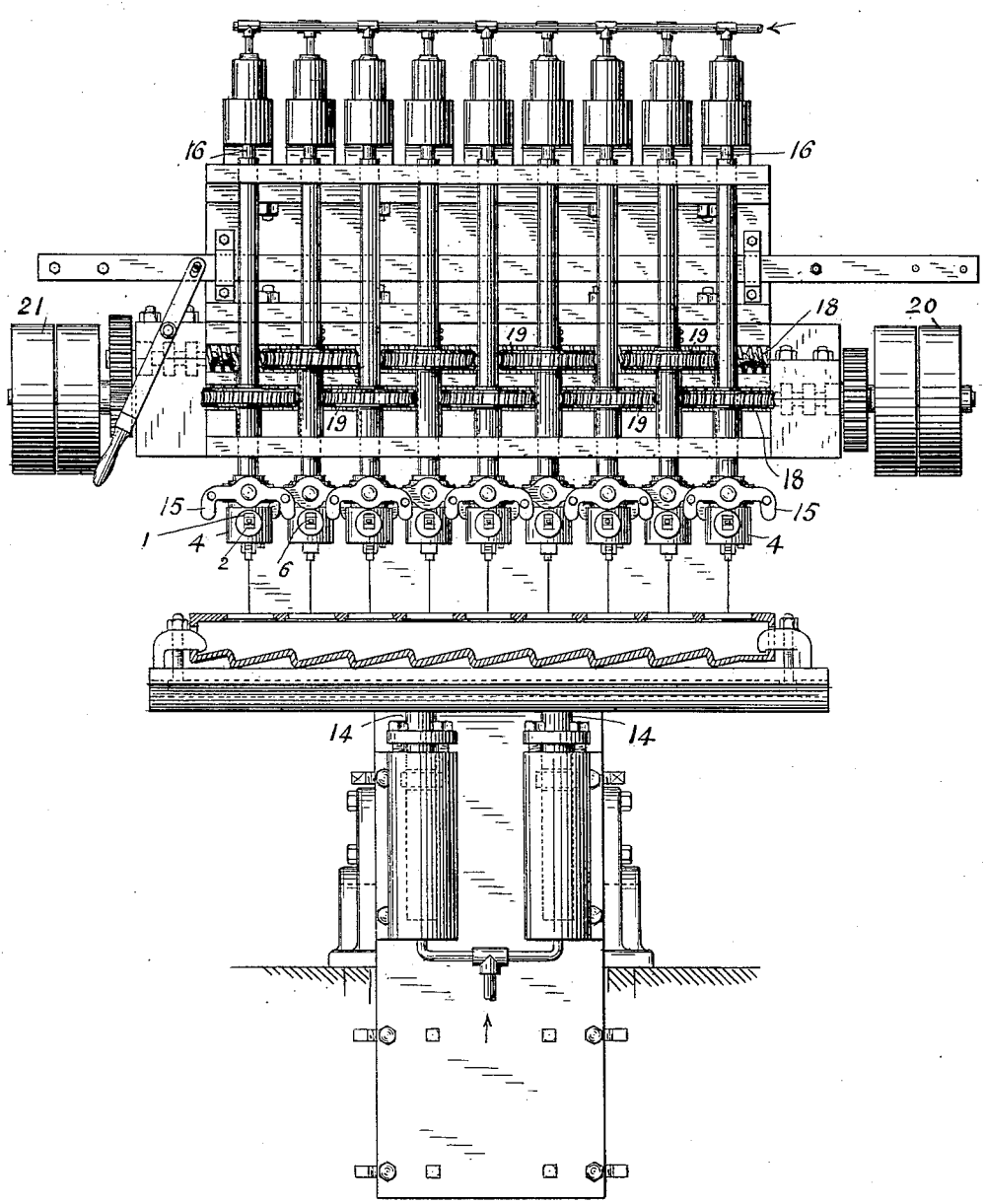

In the accompanying drawings, Figure 1 is an end elevation; Fig. 2, a front view of the same; Fig. 3, a front elevation of a multiple arrangement of the parts; Fig. 4, an end view of Fig. 3; Figs. 5, 6, 7, 8, 9, and 10, enlarged views of the various operative devices assembled; and Figs. 11, 12, 13, 14, 15, 16, 17, and 18, enlarged views of parts of the operative devices detached, all hereinafter particularly referred to.

The framework or stationary part of the machine for supporting the operating devices is sufficiently illustrated in Figs. 1, 2, and 4, the header to be operated upon being fixed upon the adjustable table or bed 13, as clearly shown in said figures. This table carrying the header is adjusted and supported vertically to and from the cutter-head 4, as shown by the relative positions therewith indicated in Figs. 1 and 4, by means of the hydraulic plungers 14 at the base of the machine. A yoke 15 is pivoted on a ring or collar 11 on the spindle of the cutter-head 4, which is brought in contact with the face of the header when it is elevated to the position to be operated upon, as shown in Fig. 2. The distance adjusted between the contact ends of the yoke with the face of the header and the upper cutting edge of the cutter 1 determines the depth of the rabbet to be made in the face of the header, the spindle of the cutter-head 4 being held in position by a small hydraulic ram 16 with a constant pressure.

The two cutters 1 and 2, (see Figs. 5 and 6,) are arranged in a recess or cavity in the piston 3 above and below the shell 5. When only one cutting-tool is employed, a blank block 12, Fig. 14, is substituted in place of the other cutting-tool. Inside this shell 5 a hard-steel pin 6 is placed, having a projecting end rounded to move in contact with the edge of the hand-hole, its inner end bearing against the wedge-shaped screw 7. This screw 7 is provided with a ratchet-nut 22, which engages with a pawl 8, pivoted to the head 4. The screw 7 and its ratchet-nut 22 are carried by the piston 3. Therefore when the latter is reciprocated the ratchet-nut engages with a pawl 8, and the pawl being pivoted to the head 4, Fig. 7, causes a rotation of the nut, which gradually lowers the screw 7, its wedge-shaped end permitting the loose pin 6 to recede and follow its inclined end, Fig. 6, and allowing the cutters 1 and 2 to advance in their cutting movement as the head 4 is rotated. The single set-screw 9 serves to hold both the cutters 1 and 2 and the guide-pin case 5 in a fixed position relative with the piston 3.

The water which supplies the piston 3 is admitted through a port-hole in the spindle of the cutter-head 4, which is provided with a hollow packed ring 11, in which said spindle rotates, the ring containing a supply of water which maintains a pressure at all points of its rotation and keeps the piston 3 firmly pressed out against the operative devices bearing upon the edge of the oval-shaped hole.

The hydraulic supply-ring 11 is connected by means of a flexible hydraulic pipe 17, Fig. 1, which may be run in any convenient direction or manner.

The water-supply to the hydraulic rams 14 is in practice under control of a valve, as well as the water admitted through the pipe 17, so that the various movements in adjusting the work are under the control of the operator.

In Fig. 5 the parts are shown in relative position for operation. The pin 6 is extended slightly beyond the cutting edges of the tools 1 and 2 by elevating the inclined end of the screw 7 until its full diameter intervenes behind said pin. As the cutter-head 4 is rotated in the oval hole which has been previously made in the plate the constant pressure through the port 10 to the piston 3 causes the same to press uniformly outward at all points of the rotation of the cutter-head. This keeps the pin 6 in constant contact with the edge of the hole, which in turn prevents the cutting edges of 1 and 2 from action. The reciprocating motion of the piston 3, carrying with it the screw 7 and its ratchet-nut 22, causes the teeth of said nut to engage twice with the pawl 8 in each revolution. This gradually advances the nut on the screw 7, drawing down the inclined end of it and allowing the pin 6 to gradually recede toward the center of the machine, which allows the cutters 1 and 2 to contact with the work and to advance in their cut, forming the desired rabbet on the edge of the plate extending radially outward from the edge of the oval hole.

Fig. 6 shows the position of the tool advanced, the inclined face of the screw 7 being drawn down by the nut 22.

Figs. 3 and 4 show simply a multiple arrangement of the machine with geared connections 18 19 and driving and shifting pulleys 20 21 and attachments by means of which various numbers of holes can be rabbeted at the same time. In this instance the relative direction of rotation of the spindles and also of the reciprocation of the pistons in the cutter-heads may be changed to maintain equal strains on the mechanism and resistance on the header if found necessary in practice, which will be well understood by those skilled in the art.

Having thus fully described my invention, what I claim, and desire to secure by Letters Patent, is—

1. A machine for rabbeting the edge of oval-shaped hand-holes, comprising a table or bed for supporting the header, a rotating tool-holder operating within the hand-hole, and carrying reciprocating tools for forming the rabbet operated around the oval hole on one or simultaneously on both edges of the face of the header, as set forth.

2. In a machine for rabbeting the edge of oval holes, a rotating spindle and head having a transversely-reciprocating piston in which the cutting and guiding tools are placed, and means for operating said piston and tools conformably with the contour of the oval hole, as set forth.

3. In a machine for rabbeting the edge of oval holes, a rotating spindle and head, a transverse reciprocating tool-holder carrying one or more cutting-blades, and an intermediate guiding-bar operating coincident with the reciprocating holder, but independent of the cutting-blades, substantially as described.

In testimony whereof I affix my signature in presence of two witnesses.

CAMPBELL P. HIGGINS.

Witnesses:
JOSEPH F. JAQUITT,
JOSEPH RUSHTON.